Dec. 27, 1938.   H. P. MANLY   2,141,479
TUBE TESTER
Filed April 13, 1936
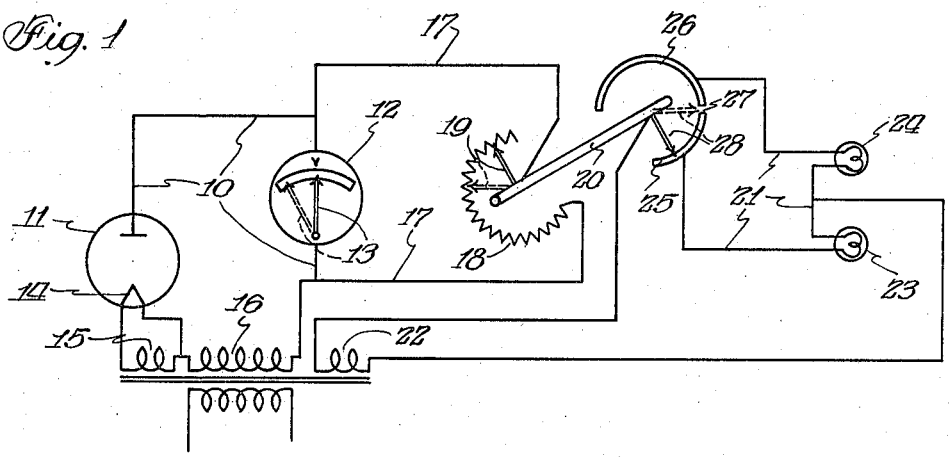
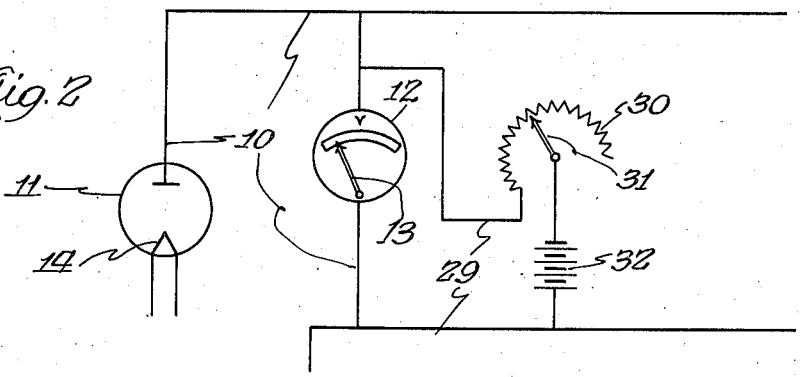
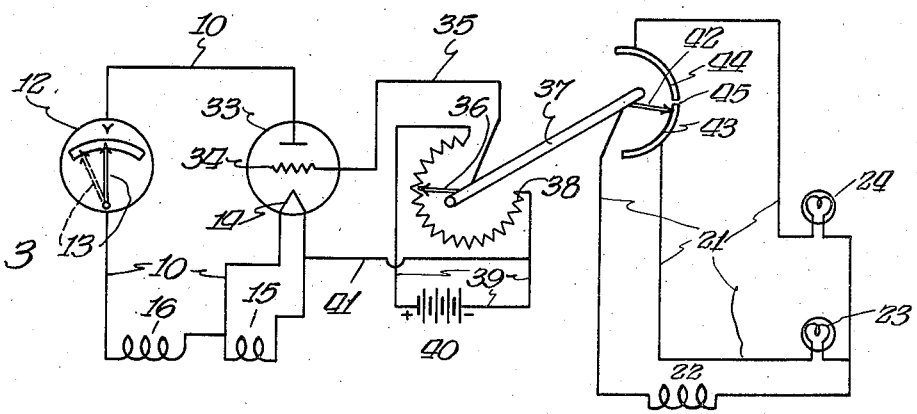
Inventor:
Harold P. Manly.
By: Brayton Richards
Attorney Patented Dec. 27, 1938

2,141,479

UNITED STATES PATENT OFFICE 2,141,479

TUBE TESTER

Harold P. Manly, Niles Center, Ill.

Application April 13, 1936, Serial No. 74,104

4 Claims. (Cl. 250—27)

The invention relates to tube testers for testing electronic tubes and has for its primary object the provision of an improved tube tester of the character indicated which is of simple and economical construction and highly efficient in use.

Another object of the invention is the provision of a tube tester of the character indicated arranged with visible signals incorporated therein and so constructed and arranged that material variations in the qualities of such tubes will be visibly indicated thereby.

Other objects will appear hereinafter.

The invention consists in the combinations and arrangements of parts hereinafter described and claimed.

The invention will be best understood by reference to the accompanying drawing forming a part of this specification, and in which Fig. 1 is a diagrammatic view illustrating a tube tester embodying the invention;

Fig. 2 a similar view of a portion of said tester but showing a slight modification or addition thereto; and Fig. 3 a view similar to Fig. 1 but showing a still further modification.

The embodiment of the invention illustrated in Fig. 1 comprises a testing circuit 10 including an electronic tube 11, and a current flow indicator or meter 12 having an indicator arrow 13. The tube filament or cathode 14 receives current from section 15 of a transformer, as indicated, arranged to serve as a source of current for the different circuits, transformer section 16 furnishing a flow of current passing through the tube plate and the indicator 12, as will be readily understood.

Associated with the circuit 10 is a shunt circuit 17 including an adjustable resistor 18 controlled by a rocker contact arm 19 on a rocker shaft 20. As will be readily understood, the position assumed by the arrow or pointer 13 of the indicator 12 depends upon the amount of current flowing through the tube and on the shunt resistance, which resistance is in turn determined by the position of the switch-arm 19 relatively to the resistor 18. If it is desired to increase the proportion of the tube current which flows through the indicator, the resistance of the resistor will be increased, and if it is desired to decrease the flow of such current through the indicator, the resistance of the resistor will be decreased. In this manner the position of the arrow or pointer 13 of the indicator 12 may be adjusted as desired within the limits of the apparatus.

A signal circuit 21 is arranged as shown to derive its current from the section 22 of the transformer. The circuit 21 is divided, as shown, into two shunt circuits, each including one of the signal lights 23 and 24. Preferably the signal light 23 is a red light to indicate a defective or unsatisfactory tube, and the light 24 is a green light to indicate a good or satisfactory tube. The lights 23 and 24 are connected as shown with segmental electric contacts 25 and 26 arranged as shown in circumferential relation with a gap 27 between them. A second rocker switch-arm 28 is mounted on the shaft 20 to cooperate as indicated with the contacts 25 and 26 and is in turn connected with the circuit 21.

In testing a tube, the tube to be tested is inserted in the circuit 10 with the switch-arm 28 adjusted to a position in registration with the gap 27 and the switch-arm 19 in the dotted line position as indicated in Fig. 1. The arrangement is such that under such circumstances, if the inserted tube 11 is normal or average, there will be no deviation of the needle or pointer 13. But suppose, however, that the inserted tube is defective or unsatisfactory, the flow of current is accordingly reduced to such extent as to cause deviation of the needle or pointer 13 to the dotted line position indicated in Fig. 1.

By manipulating the rocker shaft 20, the resistance of the resistor 18 is increased until the arrow or indicator 13 is returned to its central, normal full line position indicated in Fig. 1. Such manipulation of the switch-arm 19 to increase such resistance necessitates the corresponding rocking of the shaft 20 and the switch-arm 28, thereby carrying the switch-arm 28 away from the gap 27 and onto the contact 25. This causes excitation of the red light 23, thereby at once flashing a visible readily noticed and indicative signal indicating that the tube in question is bad or unsatisfactory. If a tube better than average is inserted, the deviation of the needle or pointer 13 will be in the opposite direction, thus necessitating opposite adjustment of the switch-arm 19 to bring said needle or pointer back to normal, central position. Such adjustment will carry the switch-arm 28 onto the contact 26, thereby flashing the green light 24 to indicate that the tube is above normal and satisfactory. By varying the position of the gap 27 between the contacts 25 and 26, the point of efficiency at which the tube would be indicated as satisfactory or unsatisfactory may be varied as desired. Thus a radio or electronic tube tester is provided which is of simple and economical construction and highly efficient in use.

The above described apparatus, as illustrated in Fig. 1, is especially adapted for testing tubes having substantially the same normal current. However, various types of tubes will be found to have various "normal" cathode or plate current with the constant voltage supplied from the transformer section 16. To permit of the testing of all types of tubes, I have made certain additions to the apparatus above described, as indicated in Fig. 2. Here a second shunt circuit 29 is connected with circuit 10 in shunt with the indicator 12 and equipped with an adjustable resistor 30 and an adjusting contact arm 31. A source of current 32 is also included in the shunt circuit 29 and by means of which auxiliary current may be passed through the indicator 13 from the source 32, in addition to the normal current flowing through the tube and meter. This auxiliary current may be adjusted so that, with normal tube current, the sum of the normal current and the auxiliary current will bring the meter arrow to the central, normal position. This would provide some current flowing through the indicator at all times. Were the tube to be completely defective so that no tube current would flow, the auxiliary current still would allow of the bringing of the indicator 13 to the central normal position when the switch-arm 19 is adjusted as above described. The auxiliary current source would then provide a current flow whose amount would depend upon adjustment of the resistor 18, and the switch arm 19 would allow enough of this auxiliary current to flow through the indicator to bring the arrow 13 to the central, normal position. Thus the apparatus may be adjusted to permit of the testing of a wide variety of types of radio or electronic tubes.

In Fig. 3 I have illustrated a testing apparatus in which a change of voltage rather than of current is utilized in making the test in testing tubes, such as electronic tubes having a control element such as a grid. In this instance the testing circuit 10 is arranged for the insertion of an electronic tube 33 containing a grid 34 as a control element. A wire 35 connects the grid 34 with a rocker contact arm 36 on a rocker shaft 37. The contact arm 36 cooperates with the resistor 38 connected as shown in a second testing circuit 39 which includes a battery 40 as a source of current. The circuit 39 is also connected by the wire 41 with the cathode 14 of the tube 33.

The second rocker contact arm 42 is carried by the shaft 37 and cooperates with segmental contacts 43 and 44 arranged as indicated with a gap 45 between them. The contacts 43 and 44 are included in the circuit 21 with the signal lights 23 and 24.

In use the contact arm 36 is positioned adjacent the right hand end of the resistor 38, and we will assume that upon insertion of the tube 33 in the circuit 10 the indicating needle 13 assumes the dotted line position shown and that in order to bring the needle 13 back to its central or normal position it is found necessary to swing the contact arm 36 to its full line position. Obviously such swinging of the contact arm 36 will cause a corresponding difference in voltage between the grid 34 and cathode 14 of the tube 33 which will cause a corresponding increase in the flow of current through the indicator 12 depending upon the efficiency of the tube 33, the smaller the voltage change necessary to cause the required increase in current flow, the greater the efficiency of the tube, and vice versa. The length of the contact 44 is made such that it will remain in contact with the rocker arm 42 for an extent of movement corresponding with a permissible voltage change to effect the required current increase. As long as the contact arm 42 remains in contact with the member 44, the green light 24 will be lighted, thereby indicating that the tube being tested is satisfactory. However, if a greater voltage change is required to cause the necessary increase in flow of current through the indicator and tube, the arm 42 will pass across the gap 45 onto the contact member 43, thereby lighting the red light 23 and thereby indicating that the tube being tested is unsatisfactory. The green light will go out as the indicator arm 42 passes the gap 45 indicating that the tube is on the border line between a satisfactory and an unsatisfactory tube. In this way electronic tubes having a grid control element or the like may also be readily tested for efficiency and the efficiency thereof visually portrayed by the green and red lights 24 and 23 respectively.

While I have illustrated and described the preferred forms of construction for carrying the invention into effect, these are capable of variation and modification without departing from the spirit of the invention. I therefore do not wish to be limited to the precise details disclosed, but desire to avail myself of such variations and modifications as fall within the scope of the appended claims.

I claim:

1. A tube tester comprising a tube testing circuit including a current indicator and means for inserting a tube to be tested therein; an adjustable resistor in shunt with said indicator; an adjustable contact for adjusting said resistor to vary the current flowing through said indicator; two signaling devices; and an operative mechanical connection between said contact and said signaling devices arranged to operate one device upon shifting of said contact in one direction and the other upon such shifting in the other direction.

2. A tube tester comprising a tube testing circuit including a current indicator and means for inserting a tube to be tested therein; an adjustable resistor in shunt with said indicator; a rocker shaft carrying an adjustable contact for adjusting said resistor to vary the current flowing through said indicator; a signal circuit including two signaling devices; a second contact on said rocker shaft; and two segmental electric contacts in said signal circuit arranged with a gap between them and one connected with one of said signal devices and the other with the other signal device, said second contact co-operating with said segmental contacts.

3. A tube tester comprising a tube testing circuit including a current indicator and means for inserting a tube to be tested therein; an adjustable resistor in shunt with said indicator; an adjustable contact for adjusting said resistor to vary the current flowing through said indicator; two signaling devices; an operative mechanical connection between said contact and said signaling devices arranged to operate one device upon shifting of said contact in one direction and the other upon such shifting in the other direction; a second adjustable resistor in shunt with said indicator; and a source of current in the shunt of said second resistor.

4. A tube tester comprising a tube testing circuit including a current indicator and means for inserting a tube to be tested therein; an adjustable resistor in shunt with said indicator; a rocker shaft carrying an adjustable contact for adjusting said resistor to vary the current flowing through said indicator; a signal circuit including two signaling devices; a second contact on said rocker shaft; two segmental electric contacts in said signal circuit arranged with a gap between them and one connected with one of said signal devices and the other with the other signal device, said second contact co-operating with said segmental contacts; a second adjustable resistor in shunt with said indicator; and a source of current in the shunt of said second resistor.

HAROLD P. MANLY.